Patented Sept. 22, 1942

2,296,572

UNITED STATES PATENT OFFICE 2,296,572

METHOD FOR THE PRODUCTION OF HORMONES

Tadeus Reichstein, Zurich, Switzerland, assignor, by mesne assignments, to Roche-Organon, Inc., Nutley, N. J., a corporation of New Jersey No Drawing. Application July 19, 1938, Serial No. 220,139. In Switzerland July 25, 1937

12 Claims. (Cl. 260—397.1)

This invention relates to the production of cyclopentano-polyhydro-phenanthrene compounds having a keto group in the side chain at carbon atom $C_{20}$ while the nucleus may be substituted by one or more substituents.

It is an object of the invention to prepare products which are intermediates for the manufacture of therapeutics or which are therapeutics themselves, especially for the treatment of diseases related with deficiency of the ovary or of the adrenal gland.

These compounds can be prepared by causing esters of saturated or unsaturated etiocholanic or etio-allocholanic acids, whether or not substituted in the nucleus, to react with carboxylic acids or $\beta$-dicarboxylic acids or its derivatives such as esters, amides, nitrils, alkoxy- or acyloxy derivatives, etc.

Esters of $\Delta$ 5-3-hydroxy-etiocholenic acid may be regarded as a representative member of the group of compounds suitable as starting materials for the purposes of this invention. That acid is described by Steiger and Reichstein in Helv. Chim. Acta 20, 1040 (1937).

The general character of these acids is that there should be a hydrogen atom attached to the same carbon atom that bears a carboxyl.

The reaction or condensation is caused to proceed with alkali- or earth alkali metals as condensing agents.

After condensation the reaction product is saponified and decarboxylated.

The use of carboxylic acid derivatives or of dicarboxylic acid derivatives usually leads to compounds with the sidechain —CO—CH₃.

When derivatives of $\alpha$-hydroxy-carboxylic acids are used compounds with a side chain of the form —CO—CH₂OH are obtained.

Both reaction products are intermediates for the preparation of therapeutics or have themselves therapeutic activities.

In order to elucidate the invention, the following examples are given. However, it is to be understood, that the invention is not at all restricted to these examples.

*Example 1.*—3-oxy-$\Delta$ 5,6-etiocholenic acid [M. P. 285° C. corr. with decomposition] is transformed in the usual way into its methylester which crystallises in needles from methanol [M. P. 180° C. corr.]

1 g. of this ester is mixed with 1 g. of ethyl acetate whereupon 0.2 g. of finely divided sodium are added. This mixture is allowed to stand for 24 hours during which the reaction mixture has become a yellow thick mass. This mass is decomposed with a mixture of ice and dilute hydrochloric acid. Thereupon the mixture is repeatedly extracted with ether. The united etheral extracts are dried and evaporated. The crude keto-ester so obtained is saponified and decarboxylated by boiling it for 12 hours with dilute sodium hydroxide in the presence of alcohol. The reaction mixture is extracted with ether, leaving the acid fraction in the alkaline aqueous solution. The ether extract is evaporated, the residue distilled in a high vacuum and the distillate recrystallized from toluene. In this way crystals of pregnene-5-ol-3-one-20 (M. P. 190°) are obtained. From the acid fraction unchanged starting material may be regenerated.

*Example 2.*—3-oxy-$\Delta$ 5,6-etiocholenic acid methyl ester is condensed with methoxy acetic acid ethyl ester in the manner described in Example 1. The reaction product is decomposed with ice and dilute hydrochloric acid. The mixture is extracted with ether, the ether extract is dried and evaporated. The crude product is now saponified by boiling for several hours with dilute aqueous alcoholic hydrochloric acid. After completion of the reaction the cooled mixture is extracted with ether, the ether extract is freed from acids by shaking with a soda solution, whereupon the ether solution is dried and evaporated. The residue is distilled in a high vacuum and the distillate recrystallized from a mixture of acetone and ether. The product so obtained, $\Delta$ 5.6 pregnene-diol-3, 21-one-20, melts at 155–160° C.

What I claim is:

1. The process that comprises condensing in the presence of a metal from the class consisting of alkali and alkaline earth metals an ester of a cyclopentano - dimethyl-polyhydrophenanthrene carboxylic acid-17 with a compound of the formula

wherein $R_1$ is a radical from the class consisting of hydrogen, alkyl, acyl, alkoxyl, acyloxyl and carboxyl groups, $R_2$ is a radical from the class consisting of hydrogen alkyl, acyl, alkoxyl and acyloxyl groups, and X is a radical from the class consisting of the carboxylic ester group, carboxylic acid amide group and the nitrile group.

2. The process that comprises condensing in the presence of a metal from the class consisting of alkali and alkaline earth metals an ester of a cyclopentano-dimethyl-polyhydrophenanthrene carboxylic acid-17 with a compound of the formula

wherein $R_1$ is a radical from the class consisting of hydrogen, alkyl, acyl, alkoxyl, acyloxyl and carboxyl groups, $R_2$ is a radical from the class consisting of hydrogen, alkyl, acyl, alkoxyl and acyloxyl groups, and X is a radical from the class consisting of the carboxylic ester group, carboxylic acid amide group and the nitrile group; decomposing the reaction mixture with an acid, saponifying and decarboxylating the resultant product.

3. A process as claimed in claim 1 in which hydroxy-3-etiocholen-5-ic acid-methylester is condensed with acetic ester.

4. A process as claimed in claim 1 in which hydroxy-3-etiocholen-5-ic acid-methylester is condensed with methoxy-acetic ester.

5. A process as claimed in claim 2 in which hydroxy-3-etiocholen-5-ic acid-methylester and acetic ester are used as starting materials.

6. A process as claimed in claim 2 in which hydroxy-3-etiocholen-5-ic acid ester and methoxy-acetic ester are used as starting materials.

7. As new products the ketones of the cyclopentano-dimethyl-polyhydrophenanthrene series having a side chain at the carbon atom $C_{17}$ of the form

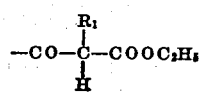

in which $R_1$ stands for a member of the class consisting of methoxy and hydrogen radicals.

8. As a new product the beta-keto-ester of the cyclopentano-dimethyl-polyhydrophenanthrene series having the structure

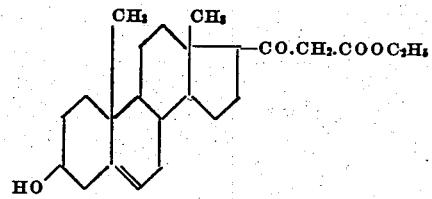

9. As a new product the beta-keto-alpha-methoxyl ester of the cyclopentano-dimethyl-polyhydro-phenanthrene series having the structure:

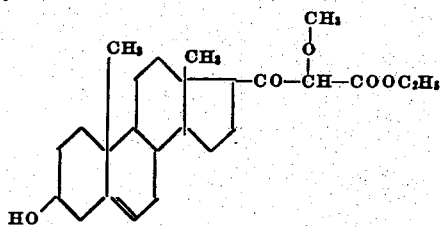

10. Method of preparing substituted cyclopentano-poly-hydrophenanthrene compounds having a keto group in the 20-position that comprises reacting a substance selected from the class consisting of an aetiocholanic acid and etioallocholanic acid with a compound of the formula

wherein $R_1$ is a radical from the class consisting of hydrogen, alkyl, acyl, alkoxyl, acyloxyl and carboxyl groups, $R_2$ is a radical from the class consisting of hydrogen, alkyl, acyl, alkoxyl and acyloxyl groups, and X is a radical from the class consisting of the carboxylic ester group, carboxylic acid amide group and the nitrile group in the presence of a substance selected from the class consisting of alkali metals and alkali earth metals, and thereafter saponifying and decarboxylating the reaction product.

11. Method for preparing compounds of the cyclopentano-polyhydrophenanthrene series having a 17-position substituent of the form:

that comprises reacting a substance of said series having a carboxylic acid substituent in the 17-position with a compound of the formula

wherein $R_1$ is a radical from the class consisting of hydrogen, alkyl, acyl, alkoxyl, acyloxyl and carboxyl groups, $R_2$ is a radical from the class consisting of hydrogen, alkyl, acyl, alkoxyl and acyloxyl groups, and X is a radical from the class consisting of the carboxylic ester group, carboxylic acid amide group and the nitrile group.

12. Method for preparing compounds of the cyclopentanopolyhydrophenanthrene series having a 17-position substituent of the form:

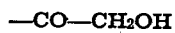

that comprises reacting a substance of said series having a carboxylic acid substituent in the 17-position with a compound of the formula

wherein $R_1$ is a radical from the class consisting of hydrogen, alkyl, acyl, alkoxyl, acyloxyl and carboxyl groups, $R_2$ is a radical from the class consisting of hydrogen, alkyl, acyl, alkoxyl and acyloxyl groups, and X is a radical from the class consisting of the carboxylic ester group, carboxylic acid amide group and the nitrile group.

TADEUS REICHSTEIN.